US011885768B2

(12) United States Patent
Lim et al.

(10) Patent No.: US 11,885,768 B2
(45) Date of Patent: Jan. 30, 2024

(54) SEMI-AUTOMATIC SCANNER FOR ULTRASONIC INSPECTION OF BRANCH PIPE WELD

(71) Applicants: Korea Inspection Eng. Co., Ltd, Seoul (KR); Foundation for Research and Business, Seoul National University of Science and Technology, Seoul (KR)

(72) Inventors: Seong Jin Lim, Seoul (KR); In Gon Jung, Gyeonggi-do (KR); Min Jung Park, Gyeonggido (KR); Ik Keun Park, Seoul (KR); Tae Sung Park, Seoul (KR)

(73) Assignees: Korea Inspection Eng. Co., Ltd, Seoul (KR); Foundation for Research and Business, Seoul National University of Science and Technology, Seoul (KR)

( * ) Notice: Subject to any disclaimer, the term of this patent is extended or adjusted under 35 U.S.C. 154(b) by 533 days.

(21) Appl. No.: 17/058,938

(22) PCT Filed: Dec. 3, 2019

(86) PCT No.: PCT/KR2019/016927
§ 371 (c)(1),
(2) Date: Nov. 25, 2020

(87) PCT Pub. No.: WO2021/025238
PCT Pub. Date: Feb. 11, 2021

(65) Prior Publication Data
US 2021/0364475 A1    Nov. 25, 2021

(30) Foreign Application Priority Data
Aug. 8, 2019 (KR) .................. 10-2019-0096631

(51) Int. Cl.
*G01N 29/22* (2006.01)
*G01N 29/04* (2006.01)
*G01N 29/265* (2006.01)

(52) U.S. Cl.
CPC ......... *G01N 29/225* (2013.01); *G01N 29/043* (2013.01); *G01N 29/265* (2013.01);
(Continued)

(58) Field of Classification Search
USPC .......................................... 73/588
See application file for complete search history.

(56) References Cited

U.S. PATENT DOCUMENTS 3,091,959 A * 6/1963 Ford ................. G01N 29/26
                                                   73/623
6,931,931 B2 * 8/2005 Graff ................ G01N 29/28
                                                   73/622
(Continued)

FOREIGN PATENT DOCUMENTS

JP    2013-061286    4/2013
JP    2018-100876    6/2018
(Continued)

OTHER PUBLICATIONS

Grounds of Reasons for Rejection dated Oct. 17, 2019 From the Korean Intellectual Property Office Re. Application No. 10-2019-0096631. (4 Pages).
International Search Report dated May 7, 2020 From the International Searching Authority Re. Application No. PCT/KR2019/016927. (3 Pages).

*Primary Examiner* — Jacques M Saint Surin (57) ABSTRACT

The present invention relates to a semi-automatic scanner for ultrasonic inspection of a branch pipe weld that has a small size and is able to perform an inspection while moving in a state of being attached to a test object by a magnetic force, thereby being applied to fittings having various shapes, such as a branch pipe and an elbow. The semi-
(Continued)

automatic scanner for ultrasonic inspection according to the present invention includes a probe configured to inspect a weld by irradiating ultrasonic waves onto a surface of a test object, a probe holder configured to couple the probe by applying an elastic force so as to be pressed against the surface of the test object, an installation bracket having a rod shape, to which the probe holder is coupled so as to be laterally movable, four wheel units installed on both front and rear side surfaces of the installation bracket so as to be vertically slidable, and four magnet parts, each of which is installed on one of the four wheel units and presses the one of the wheel units against the test object with a magnetic force.

3 Claims, 10 Drawing Sheets

(52) U.S. Cl.
CPC ............... *G01N 2291/0289* (2013.01); *G01N 2291/269* (2013.01); *G01N 2291/2675* (2013.01)

(56) References Cited

U.S. PATENT DOCUMENTS

| | | | | |
|---|---|---|---|---|
| 7,861,591 | B2* | 1/2011 | Rath | G01N 29/265 |
| | | | | 73/622 |
| 8,387,462 | B2* | 3/2013 | Yamano | G01N 29/262 |
| | | | | 73/632 |
| 10,161,913 | B2* | 12/2018 | Cendras | G01N 29/04 |
| 11,118,719 | B1* | 9/2021 | Moreau | B60L 15/2036 |
| 11,312,435 | B2* | 4/2022 | Danko | B60B 19/006 |
| 2012/0037753 | A1* | 2/2012 | Huber | B64D 9/003 |
| | | | | 244/118.1 |
| 2012/0060609 | A1* | 3/2012 | Fukutomi | G01N 29/265 |
| | | | | 73/592 |

FOREIGN PATENT DOCUMENTS

| | | |
|---|---|---|
| KR | 10-1377448 | 3/2014 |
| KR | 10-1377454 | 4/2014 |
| KR | 10-1773086 | 8/2017 |

\* cited by examiner

SEMI-AUTOMATIC SCANNER FOR ULTRASONIC INSPECTION OF BRANCH PIPE WELD

RELATED APPLICATIONS

This application is a National Phase of PCT Patent Application No. PCT/KR2019/016927 having International filing date of Dec. 3, 2019, which claims the benefit of priority of Korean Patent Application No. 10-2019-0096631 filed on Aug. 8, 2019. The contents of the above applications are all incorporated by reference as if fully set forth herein in their entirety.

FIELD AND BACKGROUND OF THE INVENTION

The present invention relates to a semi-automatic scanner for ultrasonic inspection, and more particularly, to a semi-automatic scanner for ultrasonic inspection of a branch pipe weld, which has a small size and is able to perform an inspection while moving in a state of being attached to a test object by a magnetic force, thereby being applied to fittings having various shapes such as a branch pipe and an elbow.

Among nondestructive inspection methods, a representative method of detecting defects of industrial facilities and evaluating the reliability is an ultrasonic inspection method. Recently, such an ultrasonic inspection method has been widely applied to major power generation units such as a turbine and a boiler of a power generation facility.

In particular, in plant facilities such as petroleum refinement facilities, in the case of a large pipe, a pressure vessel, a thick plate, a pipe rack, or a storage tank unit, in many cases, an inspection time should be reduced, or the use of radiation is restricted. Accordingly, the case of applying an ultrasonic inspection test method is becoming common.

However, in the case of the conventional ultrasonic inspection test, the size of an inspection device itself is large, and thus, there is a problem in that the inspection device is not suitable for an inspection operation on fittings such as small branch pipes or elbows. In particular, since such a fitting has curved surfaces that are connected in various ways, there is a problem that it is difficult to perform an inspection operation in a state in which the inspection device is pressed against a surface of a test object.

SUMMARY OF THE INVENTION

The present invention is directed to providing a semi-automatic scanner for ultrasonic inspection of a branch pipe weld that has a small size and is able to perform an inspection while moving in a state of being attached to a test object by a magnetic force, thereby being applied to fittings having various shapes such as a branch pipe and an elbow.

According to one embodiment of the present invention, a semi-automatic scanner for ultrasonic inspection includes a probe configured to inspect a weld by irradiating ultrasonic waves onto a surface of a test object, a probe holder configured to couple the probe by applying an elastic force so as to be pressed against the surface of the test object, an installation bracket having a rod shape, to which the probe holder is coupled so as to be laterally movable, four wheel units installed on both front and rear side surfaces of the installation bracket so as to be vertically slidable, and four magnet parts, each of which is installed on one of the four wheel units and presses the one of the wheel units against the test object with a magnetic force.

The wheel unit may include a vertical movement guide installed on one side surface of the installation bracket so as to be perpendicular to a length direction of the installation bracket, a vertical movement part installed to surround the vertical movement guide and slide along the vertical movement guide, an elastic pressing part installed between the vertical movement part and the vertical movement guide and configured to press the vertical movement part downward with an elastic force, and a wheel installed at a lower side end portion of the vertical movement part so as to be freely rotatable.

The magnet part may be installed on an outer surface of the wheel so as to be rotatable together with the wheel.

The magnet part may be formed in a disk shape having a diameter smaller than that of the wheel.

The probe holder may include a lateral guide part installed in the installation bracket in a direction perpendicular to a length direction of the installation bracket to guide lateral movement of the probe, a vertical movement guide part installed to vertically stand at the lateral guide part so as to be laterally movable, a vertical movement bracket installed to surround the vertical movement guide part to vertically move along the vertical movement guide part, an elastic pressing part installed between the vertical movement bracket and the vertical movement guide part and configured to press the vertical movement bracket downward using an elastic force, and a probe coupling part coupled to a front surface of the vertical movement bracket so as to be freely rotatable and configured to couple both side surfaces of the probe so as to be freely rotatable.

The lateral guide part may be inserted into and installed in a central portion of the installation bracket and may have a long hole-shaped guide hole, through which an upper end portion of the vertical movement guide part passes to be laterally movable, formed in a central portion thereof.

The semi-automatic scanner may further include a grip portion configured to connect upper surfaces of the installation brackets which are provided at both sides of the lateral guide part with the lateral guide part interposed therebetween.

The ultrasonic probe may be detachably coupled to a front surface of the probe coupling part in a one-touch manner.

The probe coupling part may be coupled to the vertical movement bracket by a coupling groove formed in a front surface of the vertical movement bracket, a coupling portion formed to protrude from a rear end of the probe coupling part and to have a locking groove and a cylindrical shape inserted into the coupling groove, and ball plungers installed to enter through side portions of the coupling groove and configured to fix the coupling portion inserted into the coupling groove by pressing the coupling portion with an elastic force.

An encoder may be further provided in any one of the four wheel units to measure a movement distance of the semi-automatic scanner.

According to the present invention, a semi-automatic scanner for ultrasonic inspection has a small size and is suitable for an inspection operation on branch pipes or fittings having various shapes. In particular, an ultrasonic probe can move to perform an inspection in a state of being completely pressed against a surface of a test object having a curved shape by a magnet part installed on each wheel unit.

DESCRIPTION OF SPECIFIC EMBODIMENTS OF THE INVENTION

Hereinafter, specific embodiments of the present invention will be described in detail with reference to the accompanying drawings.

Figure 1:
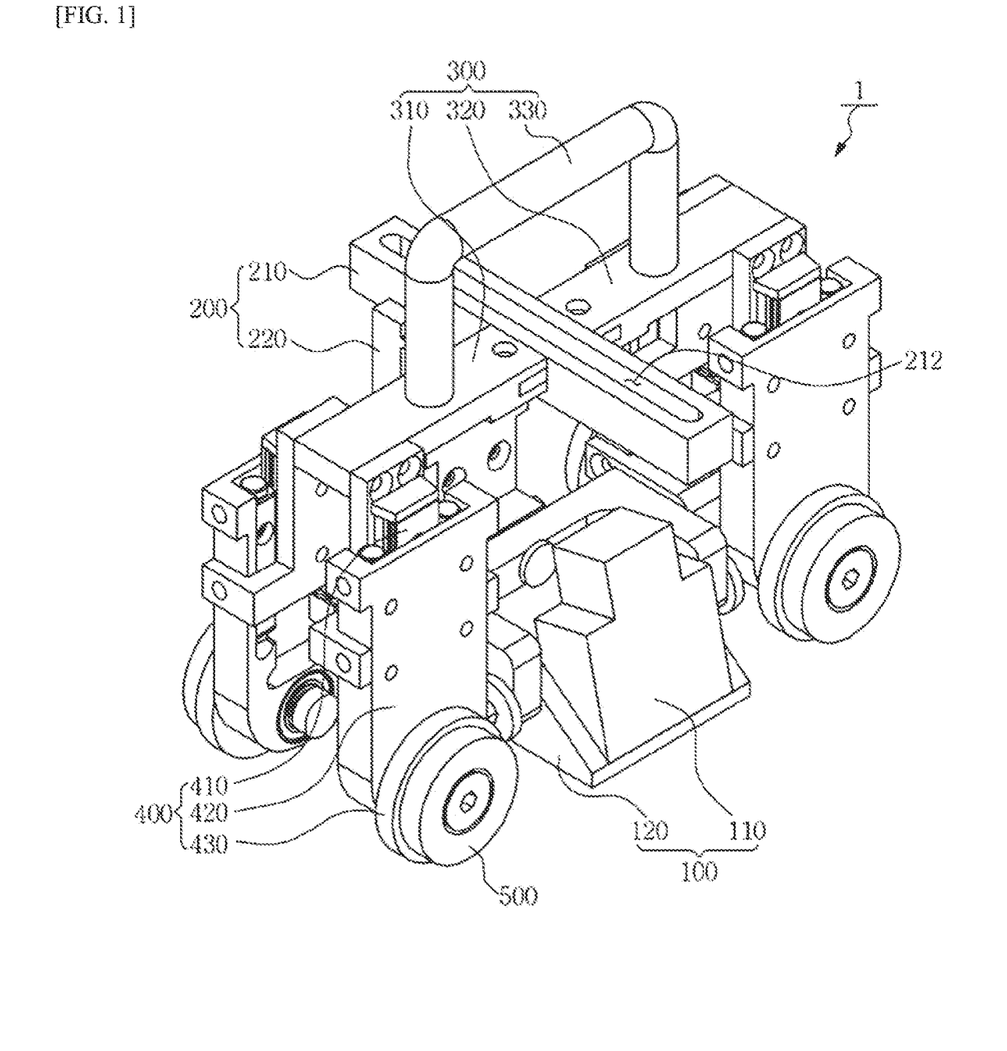
FIG. 1 is a perspective view illustrating a structure of a semi-automatic scanner for ultrasonic inspection according to one embodiment of the present invention.

As shown in FIG. 1, a semi-automatic scanner 1 for ultrasonic inspection according to the present embodiment includes an ultrasonic probe 100, a probe holder 200, an installation bracket 300, wheel units 400, and magnet parts 500.

First, the ultrasonic probe 100 is a component that inspects a weld by irradiating ultrasonic waves onto a surface of a test object. In the present embodiment, as the ultrasonic probe 100, a generally used ultrasonic probe may be adopted, and the ultrasonic probe 100 may have a size and structure so as to be easily coupled to the probe holder 200 to be described below. Specifically, the ultrasonic probe 100 may include a probe 110 and a wedge 120. Rotation coupling portions (not shown in the drawing) may be formed to protrude from both side portions of the wedge 120 so as to be rotatably coupled to the probe holder 200, or rotation coupling grooves may be formed to be engraved on the both side portions.

Figure 4:
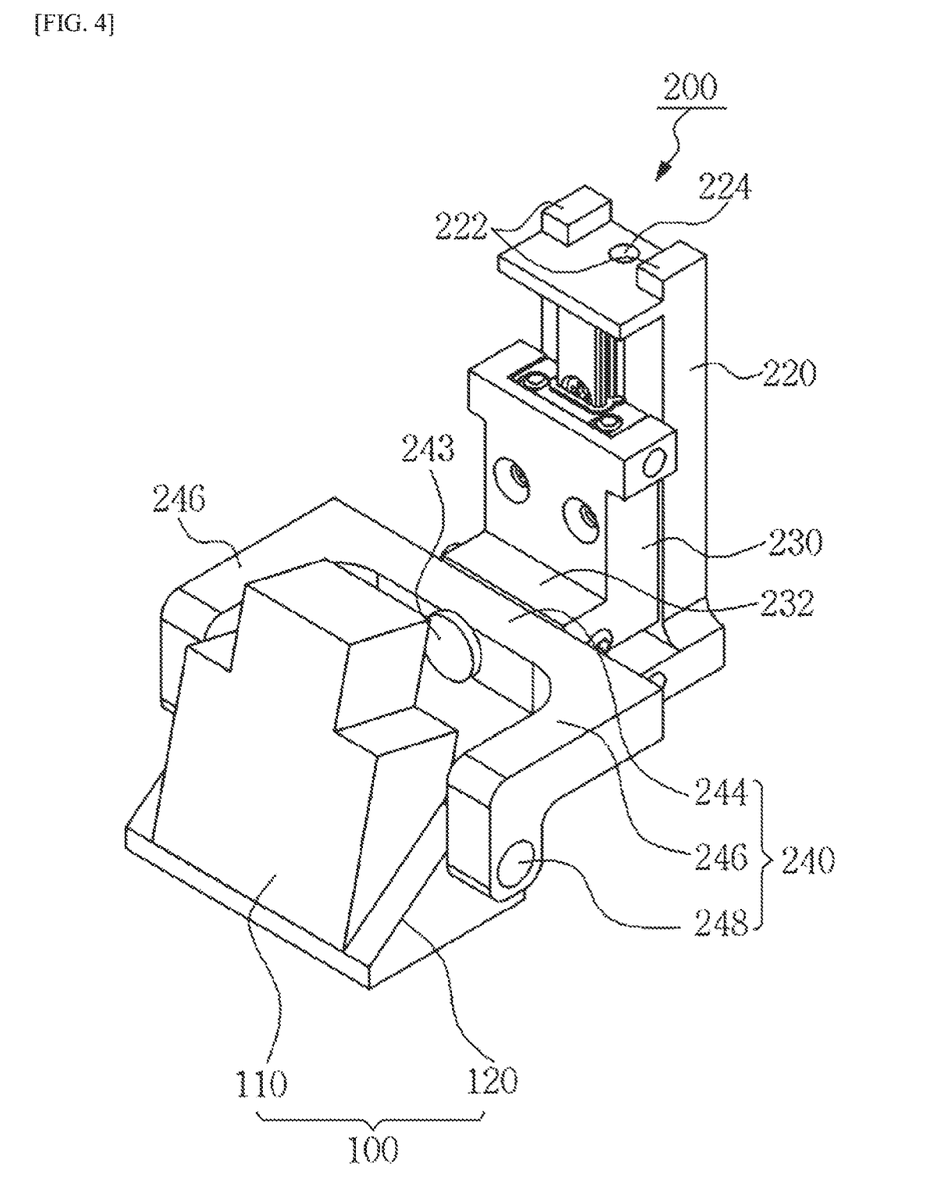
FIG. 4 is a perspective view illustrating a structure of a probe holder according to one embodiment of the present invention.

Next, as shown in FIGS. 1 and 4, the probe holder 200 is a component for coupling the ultrasonic probe 100 by applying an elastic force downward in order for the ultrasonic probe 100 to be pressed against the surface of the test object. To this end, in the present embodiment, specifically, the probe holder 200 includes a lateral guide part 210, a vertical movement guide part 220, a vertical movement bracket 230, an elastic pressing part, and a probe coupling part 240.

Figure 6:
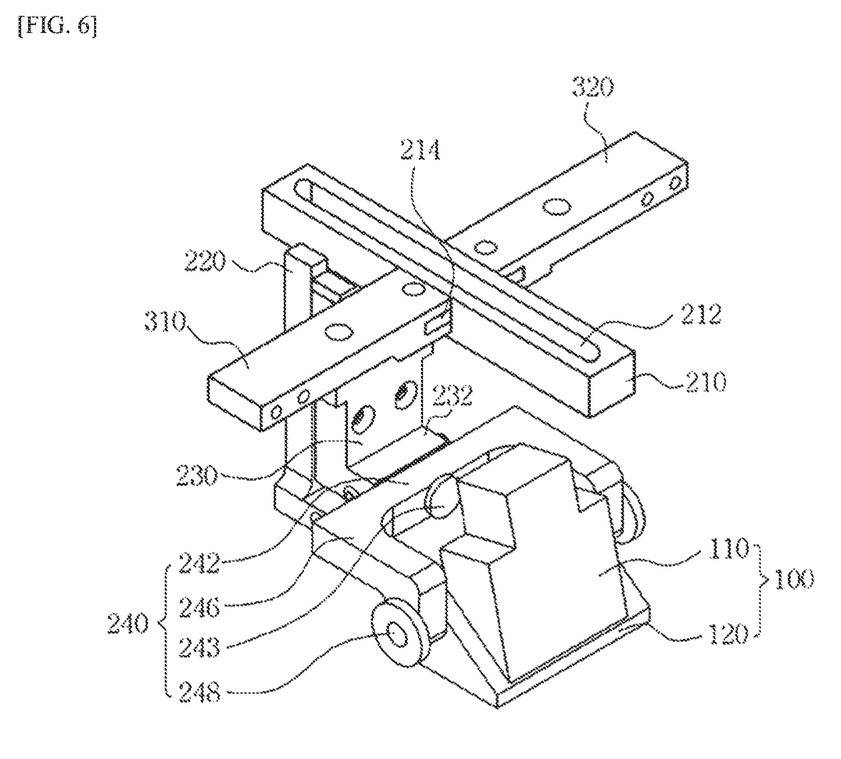
FIG. 6 is a perspective view illustrating the structure of the probe holder viewed in another direction according to one embodiment of the present invention.

First, as shown in FIGS. 1 and 6, the lateral guide part 210 is a component that is installed in the installation bracket 300 in a direction orthogonal to a length direction of the installation bracket 300 to guide the ultrasonic probe 100 in a lateral movement direction. Specifically, as shown in FIGS. 1 and 6, the lateral guide part 210 is inserted into and installed in a central portion of the installation bracket 300.

The lateral guide part 210 has a structure in which a long hole-shaped guide hole 212 is formed in a central portion thereof so that the vertical movement guide part 220 is laterally movable in a state in which an upper end portion of the vertical movement guide part 220 passes through the guide hole 212.

Coupling protrusions 214 are formed on both side surfaces of the lateral guide part 210 such that the installation bracket 300 is coupled.

Figure 5:
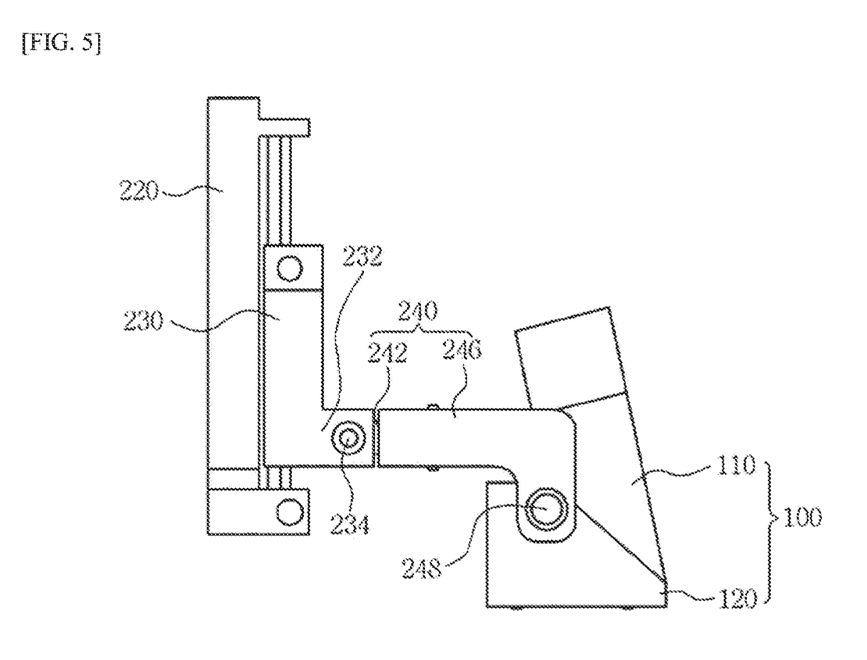
FIG. 5 is a front view illustrating the structure of the probe holder according to one embodiment of the present invention.

Next, as shown in FIGS. 4 and 5, the vertical movement guide part 220 is installed to vertically stand at the lateral guide part 210 so as to be laterally movable. The vertical movement guide part 220 is a component that guides a vertical movement direction of the vertical movement bracket 230. That is, in a process in which the ultrasonic probe 100 inspects the test object while laterally moving in a state of being pressed against the surface of the test object, when the ultrasonic probe 100 moves vertically, the vertical movement guide part 220 guides a direction of the probe coupling part 240 and the ultrasonic probe 100 coupled thereto to accurately move vertically.

A pair of lateral guide part locking steps 222 are formed on an upper surface of the vertical movement guide part 220 to be spaced a predetermined width from each other such that a lower portion of the lateral guide part 210 is inserted therebetween. In a state in which the vertical movement guide part 220 is coupled to the lateral guide part 210, as shown in FIG. 6, the lower portion of the lateral guide part 210 is inserted between the pair of lateral guide part locking steps 222. A coupling screw (not shown in the drawing) is coupled to a coupling screw groove 224 formed in a central portion of the upper surface of the vertical movement guide part 220 so that the vertical movement guide part 220 is coupled to the lateral guide part 210.

In this case, when the vertical movement guide part 220 is to be laterally moved along the lateral guide part 210, the coupling screw is loosened to move the vertical movement guide part 220. When an inspection is being performed, the coupling screw is firmly tightened to fix the vertical movement guide part 220 so as to be unmovable.

Next, as shown in FIGS. 1 and 4, the vertical movement bracket 230 is installed to surround the vertical movement guide part 220. The vertical movement bracket 230 is a component that vertically moves along the vertical movement guide part 220. That is, the vertical movement bracket 230 may be formed as a slide that vertically moves along the vertical movement guide part 220. The vertical movement bracket 230 may be formed as a ball slide for a smooth and gentle sliding operation.

As shown in FIGS. 4 and 5, the vertical movement bracket 230 is bent or protrudes forward so that a coupling protrusion 232 is formed on a front surface of the vertical movement bracket 230. A coupling groove (not shown in the drawing), into which a coupling portion 242 of the probe coupling part 240 to be described below is rotatably inserted, is formed in a front surface of the coupling protrusion 232.

In addition, plunger installation holes (not shown in the drawing) are formed to pass through both side surfaces of the coupling protrusion 232 in a direction toward the coupling groove, and ball plungers 234 to be described below are inserted into and installed in the plunger installation holes.

Next, the elastic pressing part (not shown in the drawing) is installed between the vertical movement bracket 230 and the vertical movement guide part 220. The elastic pressing part is a component that presses the vertical movement bracket 230 in a downward direction using an elastic force.

Due to the elastic pressing part (not shown in the drawing), the vertical movement bracket 230 always remains pressed downward by a constant elastic force, and when a force exceeding the elastic force is applied, the vertical movement bracket 230 moves upward along the vertical movement guide part 220.

Next, as shown in FIGS. 4 and 5, the probe coupling part 240 is freely rotatably coupled to the front surface of the vertical movement bracket 230. The probe coupling part 240 is a component that couples both side surfaces of the probe 100 so as to be freely rotatable. That is, the probe coupling part 240 itself is installed at the vertical movement bracket 230 so as to be rotatable in a vertical direction, and the ultrasonic probe 100 installed at the probe coupling part 240 is coupled so as to be rotatable in a lateral direction. Therefore, the ultrasonic probe 100, which is coupled to the probe coupling part 240, is installed in a state of being freely rotatable in two directions. The ultrasonic probe 100 may be pressed against the surface of the test object in accordance with various shapes of the test object.

In the present embodiment, as shown in FIGS. 4 and 5, specifically, the probe coupling part 240 includes a pair of arm portions 246 installed to be spaced a predetermined interval from each other such that the ultrasonic probe 100 enters therebetween, a connecting portion 244 configured to connect the pair of arm portions 246, and the coupling portion 242. As shown in FIGS. 4 and 5, coupling holes (not shown in the drawing) for coupling the ultrasonic probe 100 are formed in the pair of both arm portions 246, and coupling bolts 248 are inserted into the coupling holes to rotatably couple the ultrasonic probe 100.

Meanwhile, in the present embodiment, the ultrasonic probe 100 is detachably coupled to the probe coupling part 240 in a one-touch manner. Here, the term "one-touch manner" refers to a manner in which the ultrasonic probe 100 is coupled to or detached from the probe coupling part 240 through one operation of pressing the ultrasonic probe 100 in a direction toward the probe coupling part 240 or a direction opposite to the probe coupling part 240.

As described above, when the ultrasonic probe 100 is coupled to the probe coupling part 240 in a one-touch manner, and when the specification of the ultrasonic probe 100 is changed as needed in an inspection process, the ultrasonic probe 100 can be easily replaced through a simple operation.

Figure 9:
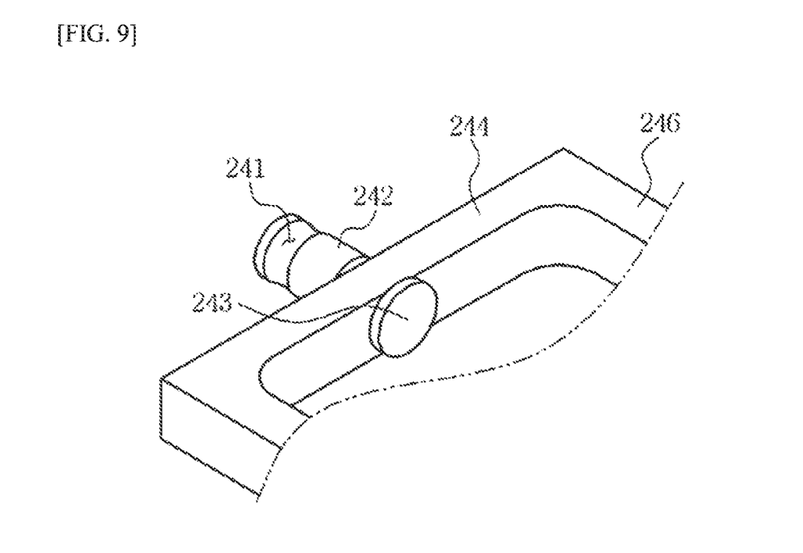
FIG. 9 is a view illustrating a structure of a coupling portion according to one embodiment of the present invention.

To this end, as described above, the coupling groove is formed in the vertical movement bracket 230, and the coupling portion 242 is formed to protrude from a rear end of the probe coupling part 240. As shown in FIG. 9, the coupling portion 242 protrudes from the rear end of the probe coupling part 240 and is formed to have a locking groove 241 along an outer circumferential surface thereof. The coupling portion 242 has a cylindrical shape inserted into the coupling groove.

Figure 10:
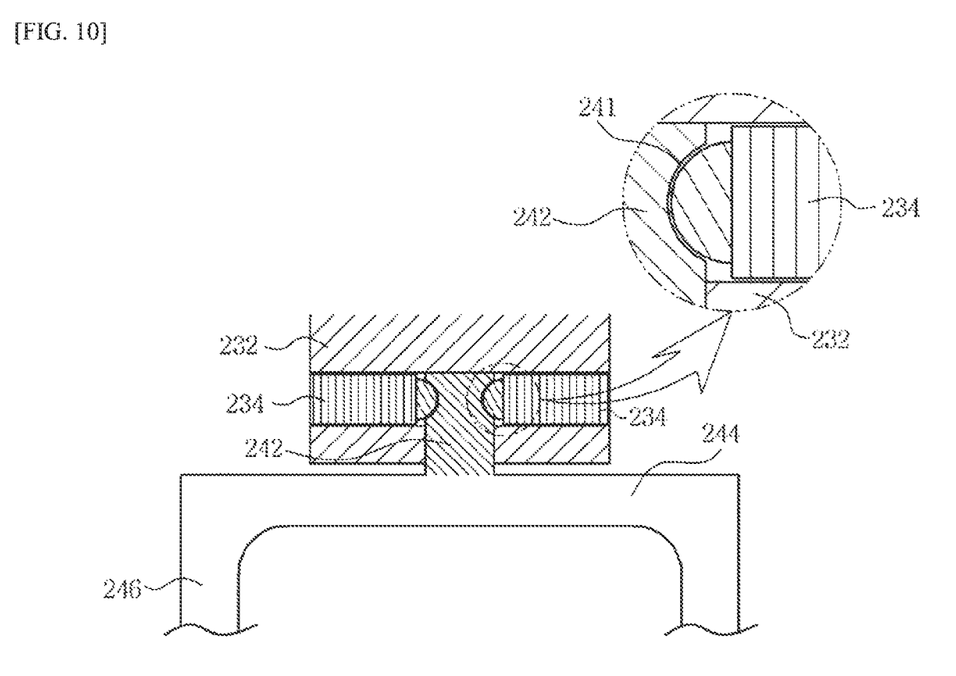
FIG. 10 is a view illustrating a coupling structure of the coupling portion of FIG. 9.

As described above, a pair of ball plungers 234 pass through the plunger installation holes formed in the vertical movement bracket 230 and are installed to enter through side portions of the coupling groove as shown in FIG. 10. The ball plungers 234 press the coupling portion 242 inserted into the coupling groove with an elastic force to fix the coupling portion 242 to not deviate from the coupling groove. Of course, when the probe coupling part 240 is pulled with a force exceeding the elastic force, the probe coupling part 240 is separated in a one-touch manner.

Next, as shown in FIG. 1, the installation bracket 300 is a rod-shaped component to which the probe holder 200 is coupled to be laterally movable. That is, the installation bracket 300 is installed to be elongated across a central portion of the semi-automatic scanner 1 for ultrasonic inspection according to the present embodiment, and the wheel units 400 are coupled to both sides thereof, and the probe holder 200 is installed in the central portion thereof to be laterally movable.

In the present embodiment, as shown in FIG. 1, the installation bracket 300 is provided with a pair of installation brackets 310 and 320 installed to symmetrically face each other on the left and right of the lateral guide part 210. As described above, when the installation bracket 300 is divided at a center thereof, and when the lateral guide part 210 is inserted and installed between the divided installation brackets 300, an overall height and size of a device may be decreased, and the vertical movement guide part 220 may easy laterally move with no interference.

Specifically, the installation bracket 300 has a structure in which one end thereof is coupled to the coupling protrusion 214 in a manner of surrounding the coupling protrusion 214 from above and below. The installation bracket 300 itself has a rod structure having a rectangular cross-sectional shape.

In the present embodiment, a grip portion 330 may be further provided to connect upper surfaces of the pair of installation brackets 310 and 320 which are symmetrically coupled to both sides of the lateral guide part 210 with the lateral guide part 210 interposed therebetween. The grip portion 330 has an overall shape of "⊏", serves as a grip that may be gripped when the semi-automatic scanner for ultrasonic inspection according to the present embodiment is moved, and concurrently performs a function of firmly coupling the pair of installation brackets 310 and 320 installed to be separated at both side of the lateral guide part 210.

A plurality of screw holes or the like for installing the wheel unit 400 are formed in both side surfaces of the installation bracket 300.

Next, as shown in FIG. 1, four wheel units 400 are installed on both front and rear side surfaces of the installation bracket 300 so as to be vertically slidable. In the present embodiment, since each of the four wheel units 400 is installed to be vertically slidable and is in a state of being pressed downward by an elastic force, even when the semi-automatic scanner 1 for ultrasonic inspection according to the embodiment moves on an uneven surface of a test object 10 during an inspection process, the semi-automatic scanner 1 for ultrasonic inspection can stably move on the surface of the test object to perform an inspection.

Figure 2:
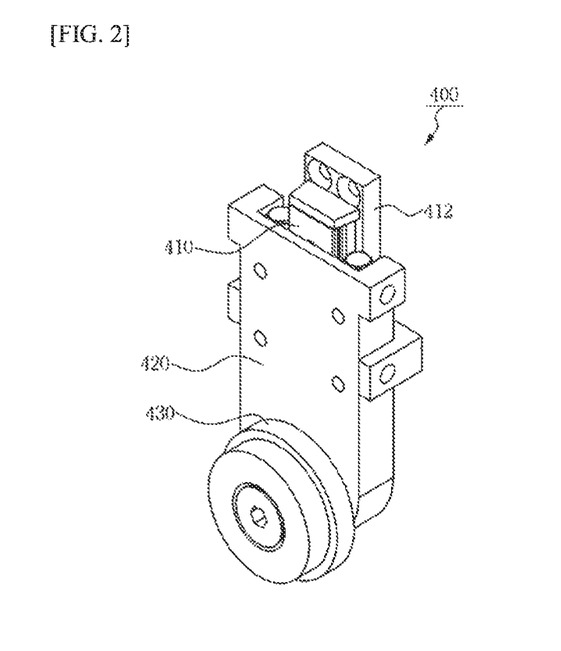
FIG. 2 is a perspective view illustrating a structure of a wheel unit according to one embodiment of the present invention.
Figure 3:
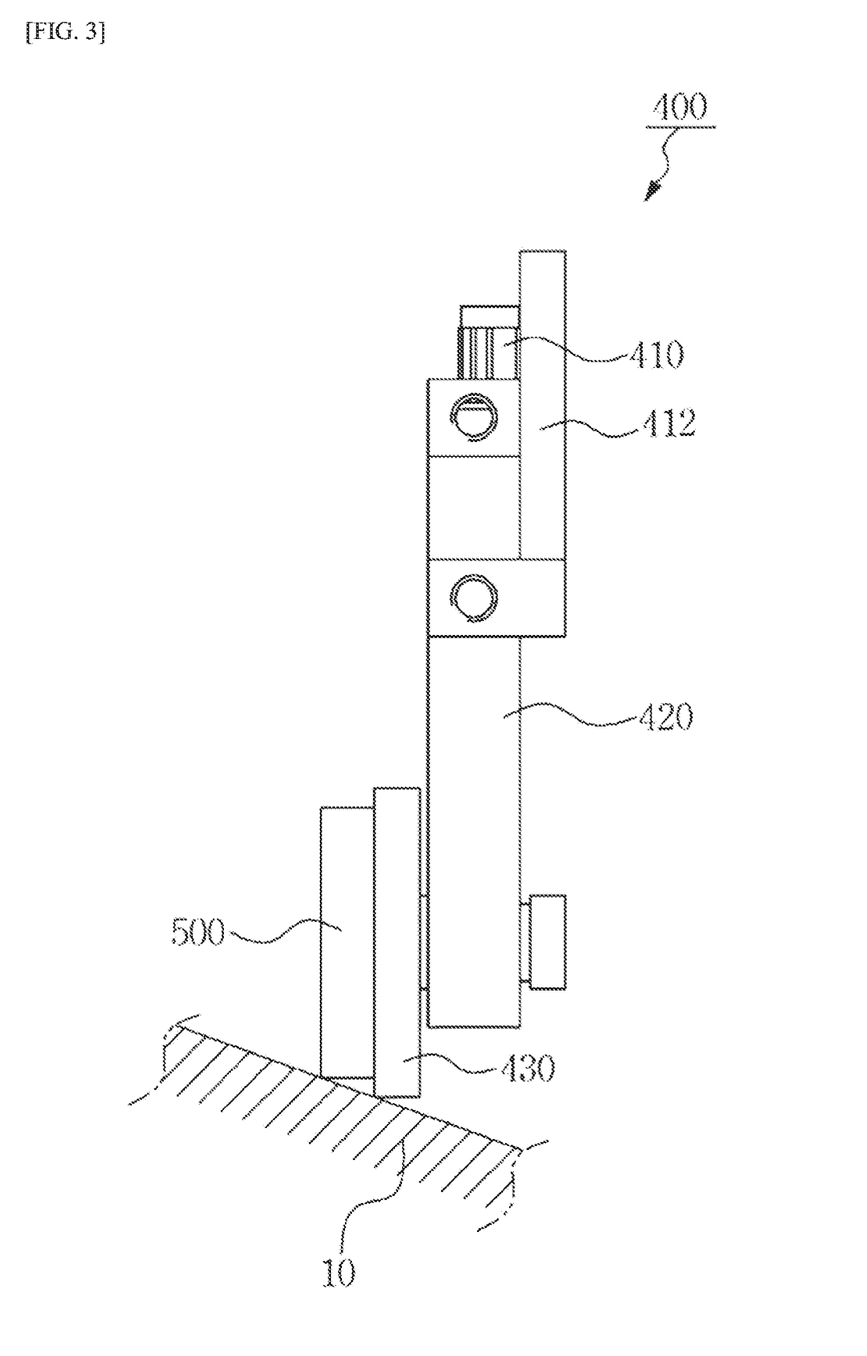
FIG. 3 is a front view illustrating the structure of the wheel unit according to one embodiment of the present invention.

To this end, in the present embodiment, as shown in FIGS. 2 and 3, specifically, the wheel unit 400 may include a vertical movement guide 410, a vertical movement part 420, an elastic pressing part, and a wheel 430.

First, the vertical movement guide 410 is installed on one side surface of the installation bracket 300 so as to be perpendicular to a length direction of the installation bracket 300. The vertical movement guide 410 is a component that guides a vertical movement direction of the vertical movement part 420. Specifically, as shown in FIGS. 2 and 3, an installation block 412 is installed on the side surface of the installation bracket 300 through bolt coupling or the like. The vertical movement guide 410 may be installed in a form which is fixed to a front surface of the installation block 412 and is surrounded by the vertical movement part 420.

Next, as shown in FIGS. 2 and 3, the vertical movement part 420 is installed to surround the vertical movement guide 410 and is a component that slides along the vertical movement guide 410. Specifically, the vertical movement part 420 is formed as a slide that is coupled to the vertical movement guide 410 to slide. In particular, the vertical movement part 420 may be formed as a ball slide so as to be stably and smoothly slidable.

Next, the elastic pressing part (not shown in the drawing) is installed between the vertical movement part 420 and the vertical movement guide 410. The elastic pressing part is a component that presses the vertical movement part 420 in a downward direction with a constant elastic force. Therefore, the wheel 430 always remains pressed downward by an elastic force, and when a force exceeding the elastic force is applied, the wheel 430 moves upward.

Next, as shown in FIGS. 2 and 3, the wheel 430 is a component installed to be freely rotatable at a lower side end portion of the vertical movement part 420. The wheel 430 may be made of a steel material so as to be stably driven.

Figure 7:
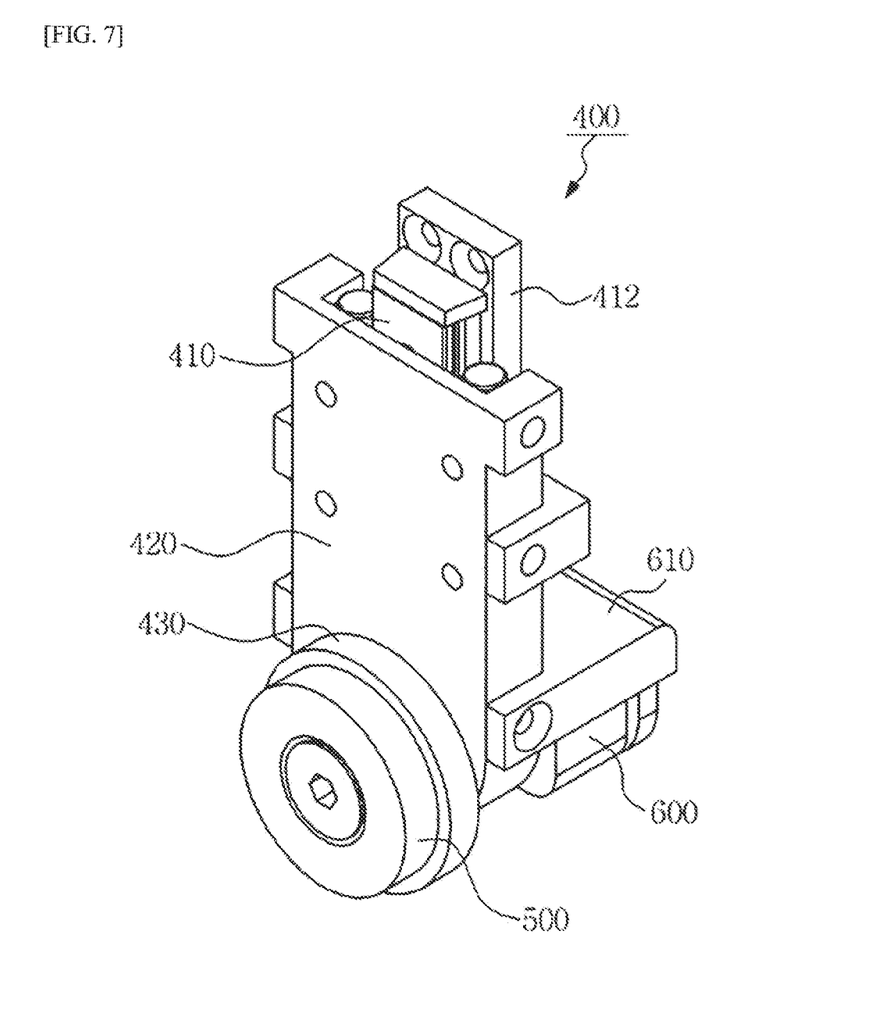
FIG. 7 is a perspective view illustrating a structure in which an encoder according to one embodiment of the present invention is installed.
Figure 8:
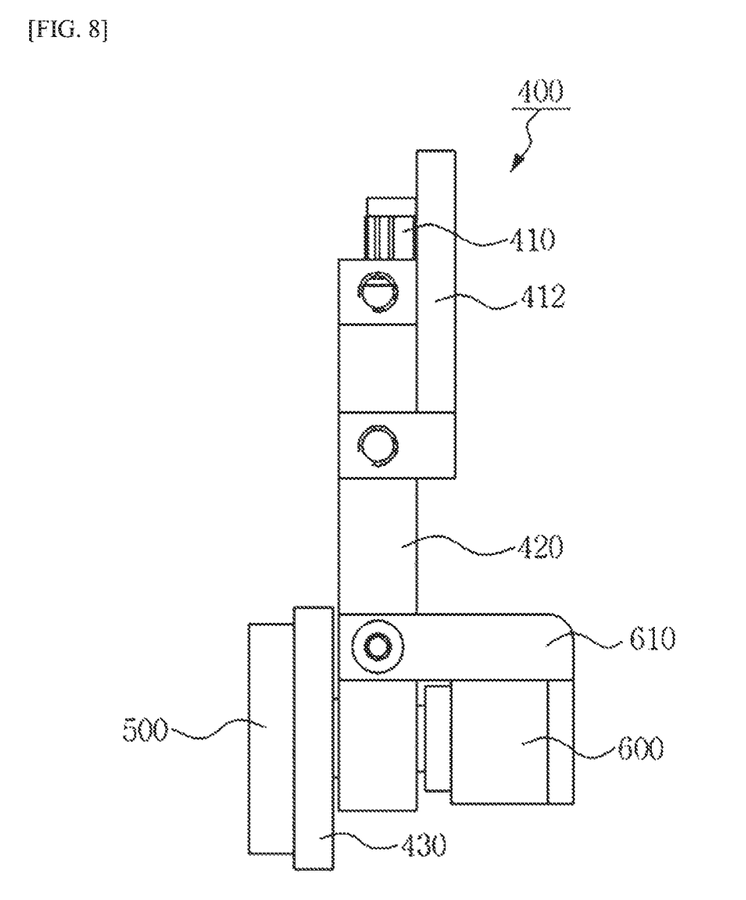
FIG. 8 is a front view illustrating the structure in which the encoder according to one embodiment of the present invention is installed.

Meanwhile, in the semi-automatic scanner 1 for ultrasonic inspection according to the present embodiment, as shown in FIGS. 7 and 8, an encoder 600 may be further provided in any one of the four wheel units 400. The encoder 600 is a component that accurately measures a distance by which the semi-automatic scanner for ultrasonic inspection moves for inspection. The encoder 600 may be installed in the wheel 430 using an encoder installation part 610, may accurately measure a movement distance, and may occupy a small installation space.

In particular, in the present embodiment, as shown in FIGS. 7 and 8, the encoder 600 may be installed inside any one wheel 430 of the four wheels 430.

Next, as shown in FIGS. 1 to 3, the magnet part 500 is installed on each of the four wheel units 400 and is a component that presses the wheel unit 400 against the test object 10 with a magnetic force. That is, the four magnet parts 500 are installed on the four wheels 430 to press the four wheels 430 against the surface of the test object made of a paramagnetic material. As described above, when the four wheels 430 are pressed against the surface of the test object, a test can be stably performed even on the test object installed at various angles and at various positions.

In the present embodiment, as shown in FIGS. 2 and 3, when the magnet part 500 is installed on an outer surface of the wheel 430 to rotate together with the wheel 430, the wheels 430 can be most effectively pressed against the surface of the test object.

In this case, when the magnet part 500 is formed in a disc shape having a diameter smaller than that of the wheel 430 as shown in FIGS. 2 and 3, as shown in FIG. 3, the magnet part 500 can stably travel on the surface of the test object 10 in a state of being inclined.

[Descriptions of Reference Numerals]

| | |
|---|---|
| 1: semi-automatic scanner for ultrasonic inspection | 100: ultrasonic probe |
| 200: probe holder | 300: installation bracket |
| 400: wheel unit | 500: magnet part |
| 600: encoder | |

The invention claimed is:

1. A semi-automatic scanner for ultrasonic inspection, comprising:
   a probe configured to inspect a weld by irradiating ultrasonic waves onto a surface of a test object;
   a probe holder configured to couple the probe by applying an elastic force so as to be pressed against the surface of the test object;
   an installation bracket having a rod shape to which the probe holder is coupled so as to be laterally movable;
   four wheel units installed on both front and rear side surfaces of the installation bracket so as to be vertically slidable; and
   four magnet parts, each of which is installed on one of the four wheel units and presses the one of the wheel units against the test object with a magnetic force;
   wherein the probe holder includes:
   a lateral guide part installed in the installation bracket in a direction perpendicular to a length direction of the installation bracket to guide lateral movement of the probe,
   a vertical movement guide part installed to vertically stand at the lateral guide part so as to be laterally movable,
   a vertical movement bracket installed to surround the vertical movement guide part to vertically move along the vertical movement guide part,
   an elastic pressing part installed between the vertical movement bracket and the vertical movement guide part and configured to press the vertical movement bracket downward using an elastic force, and
   a probe coupling part coupled to a front surface of the vertical movement bracket so as to be freely rotatable and configured to couple both side surfaces of the probe so as to be freely rotatable;
   wherein the wheel unit includes:
   a vertical movement guide installed on one side surface of the installation bracket so as to be perpendicular to a length direction of the installation bracket,
   a vertical movement part installed to surround the vertical movement guide and slide along the vertical movement guide,
   an elastic pressing part installed between the vertical movement part and the vertical movement guide and configured to press the vertical movement part downward with an elastic force, and
   a wheel installed at a lower side end portion of the vertical movement part so as to be freely rotatable;
   wherein the installation bracket is provided with a pair of installation brackets installed to symmetrically face each other on the left and right of the lateral guide part, the installation bracket is divided at a center thereof, the lateral guide part is inserted and installed between the divided installation brackets;
   wherein a coupling groove is formed in the vertical movement bracket, a coupling portion is formed to protrude from a rear end of the probe coupling part, the coupling portion protrudes from the rear end of the probe coupling part and is formed to have a locking groove along an outer circumferential surface thereof, the coupling portion has a cylindrical shape inserted into the coupling groove;
   wherein a pair of ball plungers pass through plunger installation holes formed in the vertical movement bracket and are installed to enter through side portions of the coupling groove, the ball plungers press the coupling portion inserted into the coupling groove with an elastic force to fix the coupling portion to not deviate from the coupling groove.

2. The semi-automatic scanner of claim 1, wherein the magnet part is installed on an outer surface of the wheel so as to be rotatable together with the wheel.

3. The semi-automatic scanner of claim 2, wherein the magnet pail is formed in a disk shape having a diameter smaller than that of the wheel.

* * * * *